US008700642B2

(12) United States Patent
Mercuri

(10) Patent No.: US 8,700,642 B2
(45) Date of Patent: Apr. 15, 2014

(54) SOFTWARE AGENT FOR MONITORING CONTENT RELEVANCE

(75) Inventor: Marc E. Mercuri, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 140 days.

(21) Appl. No.: 12/728,276

(22) Filed: Mar. 22, 2010

(65) Prior Publication Data

US 2011/0231381 A1  Sep. 22, 2011

(51) Int. Cl.
*G06F 17/30* (2006.01)

(52) U.S. Cl.
USPC .......................................... 707/751

(58) Field of Classification Search
USPC .......................... 707/736, 750, 751
See application file for complete search history.

(56) References Cited

U.S. PATENT DOCUMENTS

| | | | |
|---|---|---|---|
| 6,327,590 B1 | 12/2001 | Chidlovskii et al. | |
| 6,807,558 B1* | 10/2004 | Hassett et al. | 709/203 |
| 7,461,062 B2* | 12/2008 | Stewart et al. | 1/1 |
| 7,577,706 B2* | 8/2009 | Arregui et al. | 709/206 |
| 7,606,798 B2* | 10/2009 | Ge et al. | 1/1 |
| 7,668,813 B2* | 2/2010 | Baeza-Yates | 707/999.003 |
| 7,676,520 B2* | 3/2010 | Liu et al. | 707/748 |
| 7,739,275 B2* | 6/2010 | Dubinko et al. | 707/723 |
| 8,112,426 B2* | 2/2012 | Acharya et al. | 707/748 |
| 2004/0030741 A1 | 2/2004 | Wolton et al. | |
| 2006/0100956 A1* | 5/2006 | Ryan et al. | 705/37 |
| 2007/0073708 A1* | 3/2007 | Smith et al. | 707/10 |
| 2007/0100875 A1* | 5/2007 | Chi et al. | 707/102 |
| 2007/0124194 A1* | 5/2007 | Barnette et al. | 705/10 |
| 2007/0214116 A1* | 9/2007 | Liu et al. | 707/3 |
| 2008/0162500 A1 | 7/2008 | Dettinger et al. | |
| 2009/0013006 A1* | 1/2009 | Friedl et al. | 707/200 |
| 2009/0182725 A1* | 7/2009 | Govani et al. | 707/5 |
| 2009/0216524 A1 | 8/2009 | Skubacz et al. | |
| 2009/0271232 A1 | 10/2009 | Waguet et al. | |
| 2009/0319379 A1* | 12/2009 | Joao | 705/14.73 |

OTHER PUBLICATIONS

Jones, M. Tim, "Build a Web Spider on Linux", Nov. 14, 2006, Retrieved at << http://www.ibm.com/developerworks/linux/library/I-spider/ >>, pp. 21.
"Sentiment Analysis ", 2009, Retrieved at << http://www.autonomy.com/content/Functionality/idol-functionality-sentiment/index.en.html >>, pp. 16.
Horvitz, et al., "Models of Attention in Computing and Communication: From Principles to Applications ", 2003, Retrieved at << http://research.microsoft.com/en-us/um/people/horvitz/cacm-attention.pdf >>, pp. 12.

* cited by examiner

*Primary Examiner* — Jorge A Casanova
(74) *Attorney, Agent, or Firm* — Kevin Sullivan; Kate Drakos; Micky Minhas

(57) ABSTRACT

A reputation monitoring system provides a software process that runs continuously to identify content that is fast moving and deserving of attention by an organizational representative. The system includes a software agent designed to proactively alert subscribers to potentially concerning movements of a content item within search result rankings. The agent tracks a threshold number of search results over time, and utilizes additional contextual services to determine whether to deliver an alert to subscribers. It is not uncommon for negative items to be written about an individual or organization on the web. There is significant value in being able to identify when negative items are written and if they are gaining notoriety. The reputation monitoring system provides a solution by monitoring search results.

11 Claims, 3 Drawing Sheets

SOFTWARE AGENT FOR MONITORING CONTENT RELEVANCE

BACKGROUND

An organization's reputation may be one of the most important assets that the organization possesses. For example, a company's sales may be determined, in part, by how well customers trust the company to deliver products of a high quality and on time to the customer. Many customers determine whether they will deal with a particular business by how a customer service department of the business will handle things that go wrong (e.g., a missing shipment, damaged goods, and so on). Many organizations have built substantial reputations around the quality of their customer service and others have suffered due to negative impressions of their customer service.

For example, one popular story in 2009 was that of United Airlines passenger Dave Carroll who claimed that his guitar was destroyed by the airline's baggage handlers during a flight. United Airlines would not reimburse Mr. Carroll for the damage, so he wrote a song called "United Breaks Guitars" that swept the Internet for its cleverness and humor. The damage to United's brand was estimated by one author to be $180 million based on the 10% plunge in United's share price following the incident.

As another example, blogger Jeff Jarvis on his blog Buzz Machine (www.buzzmachine.com) detailed a negative experience that he had with Dell customer service. Before long, the blog became the #4 search result on popular search engines for keywords related to Dell, so that customers were more likely to find Mr. Jarvis's negative experience than information put forth by the company or others having positive experiences with its products. The notoriety of the blog was further enhanced when major publications, such as Business Week, began to cover the story and focus even more attention on what perhaps started out as a small mistake by the company. The damage to Dell's reputation was extensive.

Internet forums and other online gathering places are increasingly becoming places where brands are discussed and where an organization's reputation can be affected by "word-of-mouth" communications of which the organization may not even be aware. Numerous forums exist where reviews can be posted and where users can discuss experiences with particular companies. Ratings agencies may rate a company based on such discussions. Some users have even created web sites with the specific purpose of discussing bad experiences with a particular company. For example, the site I Hate Starbucks (www.ihatestarbucks.com) allows users to discuss bad experiences with the coffee maker Starbucks.

In the world of the real-time web, organizations need to be able to readily identify content that merits urgent attention from a public relations (PR) or customer relationship perspective. The exploding amount of content on the Internet makes it difficult for any organization to be aware of everything that is being said about them. In some cases, the allegations may be false or may be easily rectified before a customer is too upset by the company being aware of the problem at the proper level of management. Unfortunately, information moves so fast that organizations are slow to react and the damage to the organization's brand may be extensive before the organization provides its first public response.

SUMMARY

A reputation monitoring system is described herein that provides a software process that runs continuously to identify content that is fast moving and deserving of attention by an organizational representative. The system includes a software agent designed to proactively alert subscribers to potentially concerning movements of a web item within search result rankings. The agent tracks a threshold number of search results over time, and utilizes additional contextual services to determine whether to deliver an alert to subscribers. It is not uncommon for negative items to be written about an individual or organization on the web. There is significant value in being able to identify when negative items are written and if they are gaining notoriety. The reputation monitoring system provides a solution by monitoring search results. Thus, the reputation monitoring system brings the automation and constant vigilance possible through software to the area of brand management to monitor result rankings, derive context, and monitor any variances in that context to drive business workflows defined by an organization.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
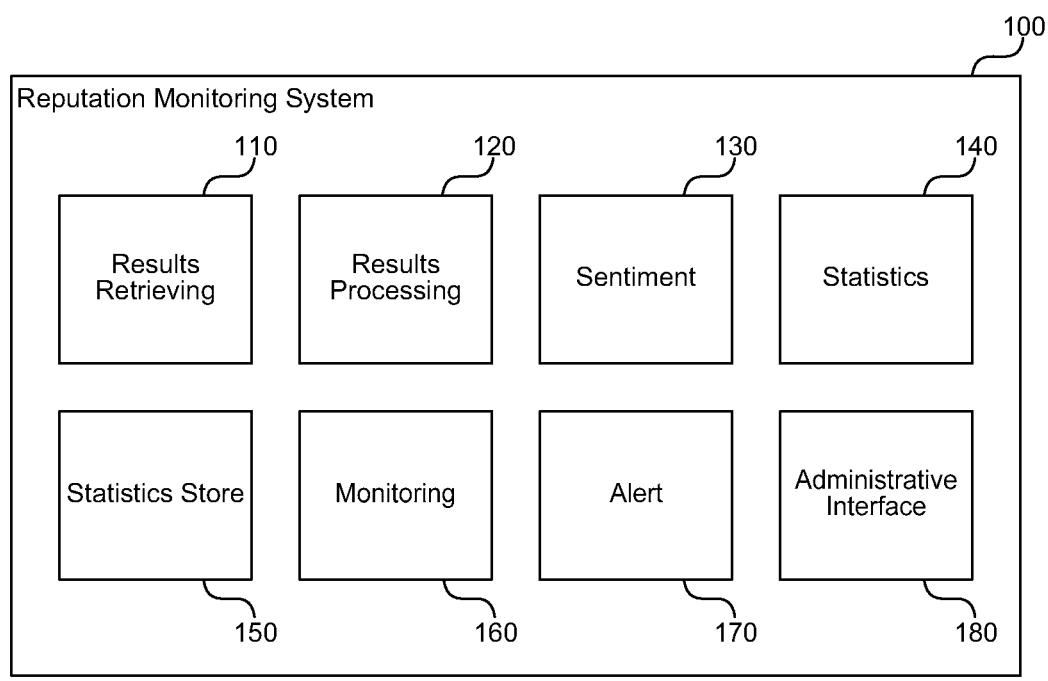
FIG. 1 is a block diagram that illustrates components of the reputation monitoring system, in one embodiment.

A reputation monitoring system is described herein that provides a software process that runs continuously to identify content that is fast moving and deserving of attention by an organizational representative. The system includes a software agent designed to proactively alert subscribers to potentially concerning movements of a web item within search result rankings. Items ranked highly by a search engine today were at one time new items on the 10th or greater page of search results. The agent tracks a threshold number of search results (e.g., the top 100) over time, and utilizes additional contextual services (e.g. item sentiment, author influence, and so forth) to determine whether to deliver an alert to subscribers. It is not uncommon for negative items to be written about an individual or organization on the web. There is significant value in being able to identify when negative items are written and if they are gaining notoriety. The reputation monitoring system provides a solution by monitoring search results. Conventional wisdom is that very few users venture beyond five pages of search results, so the ability to identify when a search result item is gaining notoriety when it is on pages 6-10—and to do so in an automated fashion—provides an organization the opportunity to change the perception of the author (and thus the existence or tone of the web item) or significant lead time to prepare a response before damage is done to a brand's reputation. Thus, the reputation monitoring system brings the automation and constant vigilance possible through software to the area of brand management to monitor result rankings, derive context (rank, sentiment, influence), and monitor any variances in that context to drive business workflows defined by an organization.

The software agent described herein may monitor a variety of sources, such as popular search engines (e.g., Bing, Google, and Yahoo), proprietary searches (e.g., Twitter, Facebook), particular blogs and forums, and so forth. The system identifies a position of various search results and monitors the movement of the position over time to determine increasing popularity of an item. An organization may not have the resources to respond to every negative (or positive) things said about the organization online, and the system helps to prioritize responses by identifying those items that are fast moving and relevant (or soon to be relevant). The system allows the organization to be notified and to engage appropriate personnel to create a response and minimize any damage from the online discussion. For example, a corporation may engage a senior customer service professional to assist the author of a negative comment to help resolve the author's dispute with the corporation. As another example, an organization may put forth a press release to establish facts about an incident that the organization believes are being misrepresented by a disgruntled author. In this way, the company can stay ahead of discussions that are likely to have an overall affect on its brand.

FIG. 1 is a block diagram that illustrates components of the reputation monitoring system, in one embodiment. The system 100 includes a results retrieving component 110, a results processing component 120, a sentiment component 130, a statistics component 140, a statistics store 150, a monitoring component 160, an alert component 170, and an administrative interface component 180. Each of these components is described in further detail herein.

The results retrieving component 110 periodically retrieves entries related to a topic of interest from a listing source. For example, the component 110 may periodically retrieve search results based on keywords related to the topic of interest from an Internet-based search engine. The component 110 may also retrieve other types of entries, such as entries of RSS feeds, results from social networks (e.g., Twitter or Facebook search results), blog entries, and so forth. The results retrieving component 110 may use Hypertext Transfer Protocol (HTTP), web service application programming interfaces (APIs), and/or other common protocols for retrieving entries from a variety of sources. An administrator defines one or more topics of interest using the administrative interface component 180 described further herein.

The results processing component 120 processes retrieved entries to identify and determine a rank for each entry. The component 120 establishes a common identifier to distinguish each entry from other entries, and so that the system 100 can track movement of entries in a list over time. For example, the component 120 may use a uniform resource locator (URL) associated with an entry as an identifier for that entry. The component 120 may track two identifiers: the identifier in the source system and a distinguishing identifier used across systems. In some cases, the source identifier may be sufficiently unique to use for both purposes, but in other cases the component 120 generates a suitable identifier for the latter purpose. The component 120 may also use other information to compose the identifier, such as the listing source from which the results retrieving component 110 retrieved the entry. The rank for an entry may be based on a rank assigned to the entry by the listing source. For example, a search engine typically lists search results starting with the most relevant result for a keyword (or keywords). The search engine may provide a fixed number of search results on a page (e.g., 10) and the results processing component 120 may factor in the page on which a search result is found and the number of the search result on that page to determine the rank (e.g., number+page*10). Other listing sources may provide a rank directly or the component may use other formulas appropriate for a particular listing source to determine a rank.

The sentiment component 130 optionally applies a weighting factor to the rank of each entry based on an information source associated with the entry. In addition to sentiment, the system 100 may consider and incorporate other factors, such as evaluative rating of media, integrity of a source, and so forth. For example, an entry from a popular and widely read website may have a higher weighting factor than an individual person's blog. On the other hand, if that individual has been very influential in the past, then the weighting factor may be high even for an individual. The weighting factor allows the system 100 to factor in a subjective reliability or reputation of a source in addition to the objective rank determined by the results processing component 120. An organization may want to prioritize responding to fast moving content such that content with a higher sentiment or reputation is addressed first.

The statistics component 140 combines the information generated by the results processing component 120 and sentiment component 130 to create a statistical data point to store in the statistics store 150. The statistical data point may include additional information, such as a time at which the entry was retrieved and a scoring value based on the rank and sentiment-weighting factor described herein. The system invokes these components on a regular basis (e.g., every hour) to continually create new statistical data points in the statistics store 150 for later analysis by the monitoring component 160. The statistical data points track changes to entries over time.

The statistics store 150 is a data store that stores statistical data points generated by the statistics component 140. The data store may include one or more hard drives, file systems, databases, storage area networks (SAN), cloud-based storage services, or any other technique for persisting data so that it can be later retrieved and analyzed.

The monitoring component 160 periodically analyzes the data points stored in the statistics store 150 to determine a movement of entries at one or more listing sources related to one or more topics of interest. For example, a company administrator may use the system 100 to monitor articles or other search results that include the company's name. The system 100 may set up a periodic search for a keyword using the company's name, and track the results returned from the search using popular search engines. The monitoring component 160 identifies entries that repeat at various data points and identifies any change in rank or scoring value. For entries that repeat and that have moved over time, the component 160 determines the velocity of movement based on the identified change in rank and a time of retrieval for multiple data points stored in the statistics store 150. In addition to velocity of movement, the component 160 may also note magnitude of movement (e.g., an entry that has moved from rank 100 to rank 20 even over a long period). For any entries that have a determined velocity or magnitude over a threshold amount, the monitoring component 160 invokes the alert component 170 to inform an administrator.

The alert component 170 provides alerts to one or more administrators when at least one entry related to a topic of interest is moving greater than a threshold amount. The term administrator, as used herein, identifies any person that an organization designates to receive or configure reputation monitoring information, and is not limited to an administrator having particular computer system privileges in the typical information technology (IT) sense. The component 170 may include limits configurable by the administrator to determine how much movement is sufficient to involve the administrator. The component 170 may also signal a priority (also configurable) of each entry, so that the administrator is alerted more urgently for entries that are moving faster than others are that are still of interest. An alert may include an email, short message service (SMS) message, outbound automated interactive voice response (IVR) solution, or any other notification technique currently available or developed in the future. The alert provides the administrator with an opportunity to address those content entries that are rapidly gaining popularity and to become aware of such entries before they have reached the front-page news (or search results).

The administrative interface component 180 provides a user interface through which an administrator can configure monitoring for one or more topics of interest. The user interface may include a web-based form, a graphical user interface (GUI), a console user interface (CUI), or any other type of interface for receiving information from a user to configure the system 100. Through the interface, the system 100 receives information such as which keywords to monitor, listing sources at which to monitor, a threshold level of movement before generating an alert, contact information for a person to which to send the alert, how frequently to monitor, and so forth. An administrator may invoke the administrative interface component 180 initially to set up monitoring and subsequently to modify settings (e.g., to tone down a too frequent alert or add new keywords to monitor).

The computing device on which the reputation monitoring system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
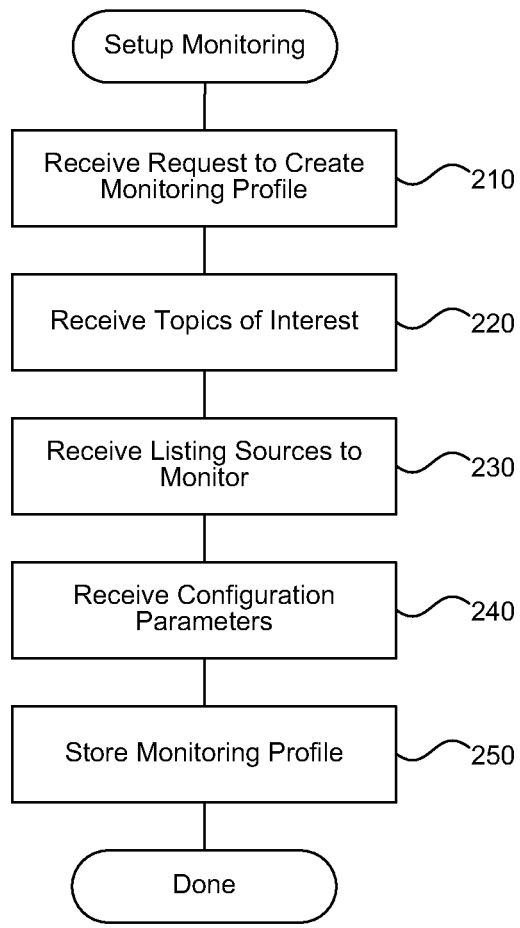
FIG. 2 is a flow diagram that illustrates processing of the administrative interface component of the reputation monitoring system, in one embodiment.

FIG. 2 is a flow diagram that illustrates processing of the administrative interface component of the reputation monitoring system, in one embodiment. Beginning in block 210, the component receives from a user a request to create a new monitoring instance. For example, an administrator or other user may access a website for creating monitoring instances. The system may provide a form or other user interface through which the user can configure the monitoring instance as described in the following blocks. Continuing in block 220, the component receives one or more topics of interest that the user wants to monitor. For example, the user may provide one or more keywords, such as the name of an organization or of one or more products produced by an organization. The topics may include names, trademarks, nicknames, subject areas, and so forth.

Continuing in block 230, the component receives one or more listing sources to monitor. A listing source may include a search engine, aggregation site, RSS feed, or other source of ranked or rankable list entries that relate to the popularity of a topic. For example, a listing source may be a search engine and each listing entry may represent a search result ordered by rank from most relevant to least relevant. Continuing in block 240, the component receives any additional configuration parameters. For example, the system may receive an indication of how often to sample for the popularity of the received topics of interest, a threshold level of entry movement before sending an alert, whether sentiment or author authority information should factor into the analysis of movement, and so forth.

Continuing in block 250, the component stores the new monitoring instance in a data store for periodic monitoring according to the received topics of interest, listing sources, and other parameters. For example, the component may store monitoring instances or profiles in a database and periodically scan listing sources to identify movement of topics of interest stored in each profile. After block 250, these steps conclude.

Figure 3:
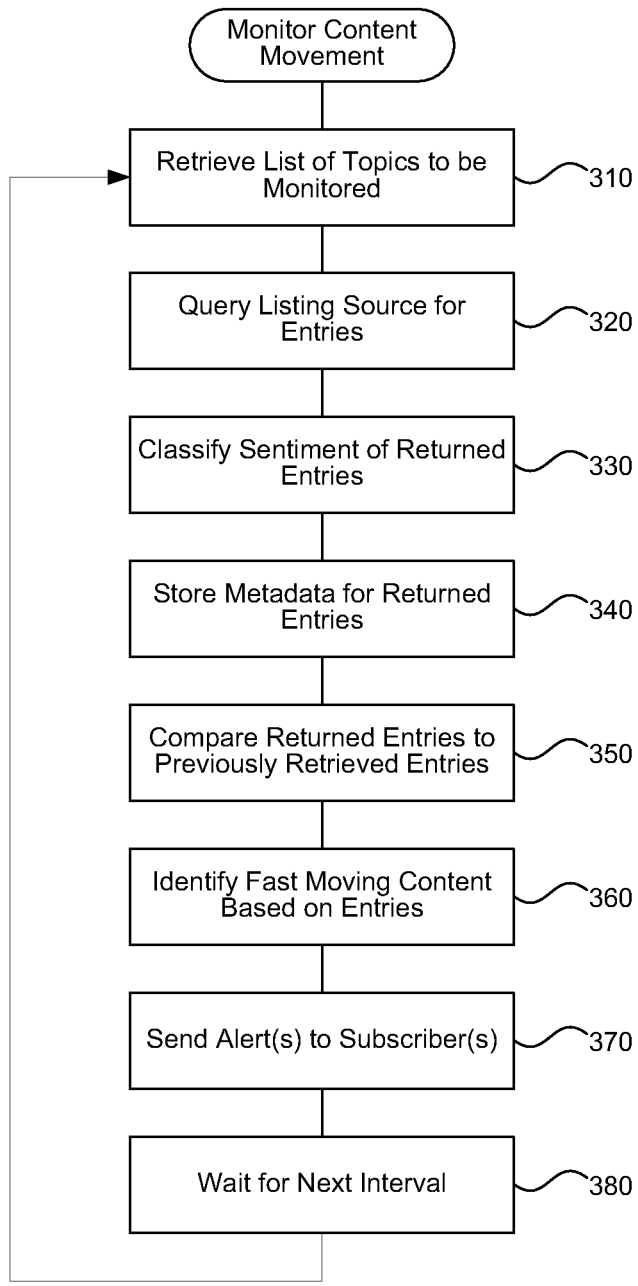
FIG. 3 is a flow diagram that illustrates processing of the reputation monitoring system to monitor online content movement, in one embodiment.

FIG. 3 is a flow diagram that illustrates processing of the reputation monitoring system to monitor online content movement, in one embodiment. Beginning in block 310, the system retrieves one or more topics of interest to be monitored. For example, the system may access a monitoring profile that defines one or more search keywords to monitor for new or fast moving search results. The monitoring profiles may include a list of listing sources at which to monitor changes of entries that relate to topics of interest. For example, a monitoring profile may specify that a subscriber would like to monitor entries related to the keyword "Dell" at the Bing search engine.

Continuing in block 320, the system queries at least one listing source for entries related to the retrieved topics of interest. For example, if the listing source is a search engine, then the system may perform a search specifying one or more keywords related to the retrieved topics of interest. The listing source returns a list of ordered results relating to the topics of interest provided. Continuing in block 330, the system classifies a sentiment of each returned entry. The sentiment may relate to author authority, blog influence, and other metrics that define a reliability or importance of the particular entry. In some cases, the system distinguishes sentiment from overall evaluation of the media (of which sentiment is another component). Search engines, in this example, establish a ranking with their own algorithms and the reputation monitoring system may accept that this ranking incorporates an influence/impact factor. The importance may be related to a historical volume of readership of a web site associated with the entry. In some embodiments, the system may determine search results that are already highly ranked, and deem sites to which such results refer to be sites of high authority when the sites come up much deeper in the search results.

Continuing in block 340, the system stores metadata for each returned entry in a result store, wherein the metadata includes an identifier of each entry, a rank of each entry, and any sentiment classification. For example, the system may create a row in a database table for each entry and include a URL or other information as an identifier, the order of the entry in the returned results as a rank, and so forth. Continuing in block 350, the system compares the returned entries with previously stored metadata related to earlier instances of the entries. For example, the system may perform the steps of blocks 310 to 340 periodically and store the results in a data store. Over time, the results record the movement of particular entries, which can be matched by their identifiers. For example, two entries with the same URL typically refer to the same site and content item, and thus movement of a particular URL in a set of results from a listing source can indicate increased popularity and/or relevance of the content referenced by the URL.

Continuing in block 360, the system identifies stored entries that indicate movement at a rate greater than a threshold stored by the system. For example, an administrator may preconfigure the system to indicate that an entry is fast moving when the entry jumps a certain number of rank levels (e.g., 10 positions) in a particular time interval. The system identifies entries that meet this threshold based on the current set of returned entries. Continuing in block 370, the system generates an alert to one or more subscribers for each identified entry that has moved more than the threshold. For example, a monitoring profile may include contact information for alerting a user when entries match the monitoring profile and a configured level of movement over time. The alert may include an email, text message, instant message (IM), automated phone call, or other form of notification to the subscriber.

Continuing in block 380, the system waits for the next time interval to repeat the process. For example, the system may perform the above steps every 10 minutes or every hour to identify results that have moved during that time. Different intervals may make sense for different listing sources. For example, a particular search engine may crawl for new results hourly, such that retrieving results more often than hourly is ineffective, but retrieving results after too many hours may miss relevant movement. An administrator may configure the interval for particular listing sources or the system may dynamically determine an appropriate interval based on observation of when results change (i.e., if results are not changing the interval may be too short). After block 380, the system loops to block 380 and the process repeats until monitoring is cancelled by an administrator or owner of a monitoring profile.

The system may continuously monitor a wide variety of topics of interest for a wide variety of subscribers. Those of ordinary skill in the art will recognize numerous ways to efficiently perform processing of tasks where there are many potentially related tasks. For example, if two different subscribers are interested in monitoring the same topics, then the system may reuse processing performed for one subscriber to provide results for the other. Likewise, the system may spread out monitoring queries the monitoring interval so that resource demands are spread out and so that the system does not place an undo load on listing sources by producing many contemporaneous requests.

In some embodiments, the reputation monitoring system provides an API through which other software components can interact with the system. For example, rather than receiving a user alert, a subscriber may want to invoke an automated script when notification of a fast moving content item is received. The system may provide push notifications or allow software components to poll the system to retrieve new fast moving results. As another example, the system may be used by third party systems as a building block to build larger solutions. Accordingly, the system may receive configuration of new monitoring profiles programmatically through the API. Thus, the system can be used by organizations that want to drive business workflows automatically based on notification of the types of events that the system provides, described further herein.

In some embodiments, the reputation monitoring system may provide various levels of automated response to fast moving content items. For example, if a blog author has written a post that is rapidly gaining in popularity and where automated analysis (e.g., using keywords or other indicators) indicates that the post is negative for a particular brand, the brand owner may instruct the system to automatically comment on the blog post indicating that the brand owner is aware of the issue that is the subject of the post and will follow up with further details. In some instances, customer satisfaction can be noticeably increased by knowing that an organization is listening to complaints or other criticism and is taking appropriate action.

In some embodiments, the reputation monitoring system may be used by a third party other than an organization whose reputation is being monitored. For example, although described herein for use by organizations as a defensive tool, the system can also be used offensively, such as by a journalist that would like to monitor topics related to particular companies that the journalist covers. The journalist may seek to get a scoop on new stories before others become aware of the stories, but being notified about content that is rapidly increasing in popularity. As another example, an organization such as Greenpeace could use the system to monitor articles about corporate environment wrongdoing and to get involved in issues gaining popularity. In some embodiments, the system may provide a generic web-based service that any party can use to monitor a particular set of keywords or topics using a variety of listing sources selected by the party. The system can then provide alerts related to the topics that the party selects, regardless of who that party is.

In some embodiments, the reputation monitoring system provides analysis across listing sources to determine relevance of a content item. For example, the system may add up hits or perform some other calculation across listing sources to determine increasing popularity or movement of the content item. The system can add hits on Twitter, YouTube, search engines, and so forth as well as popularity of those posting the comments (e.g., reach) to create a comprehensive representation of the popularity of a topic across various Internet sources.

From the foregoing, it will be appreciated that specific embodiments of the reputation monitoring system have been described herein for purposes of illustration, but that various modifications may be made without deviating from the spirit and scope of the invention. For example, although organizational reputation has been described as one motivation for using the system, the system can have numerous other applications to other fields of interest. In addition, the system is not limited to any one type of listing source and can be adapted to monitor new sources of content ranking as they are created. Accordingly, the invention is not limited except as by the appended claims.

I claim:

1. A computer-implemented method for monitoring changes in relevance of online content, the method comprising:

receiving from a user one or more topics of interest to be automatically monitored;

querying at least one listing source for entries related to the received topics of interest;

storing a time at which the entry was retrieved and a rank received from the at least one listing source for each returned entry in a result store;

comparing the rank and time for the returned entries for the user with a previously stored rank and time related to an earlier instance of the returned entries for the same user to determine a rate of change in the rank of each entry over a particular period of time, and, a magnitude of change in rank of each entry;

identifying stored entries for the user that indicate at least one of a rate of change in rank at a rate greater than a first threshold stored by the system, or a magnitude of change in rank greater than a second threshold stored by the system; and generating at least one alert to one or more subscribers for each identified entry that has at least one of change in rank at a rate greater than the first threshold, or a magnitude of change in rank greater than the second threshold, wherein the preceding steps are performed by at least one processor.

2. The method of claim 1 wherein receiving one or more topics of interest comprises accessing a monitoring profile stored in a data store that defines one or more search keywords to monitor for search result movement.

3. The method of claim 1 wherein receiving one or more topics of interest comprises receiving a monitoring profile that includes a list of listing sources at which to monitor changes of entries that relate to the topics of interest.

4. The method of claim 1 wherein querying at least one listing source comprises performing a search specifying one or more keywords related to the retrieved topics of interest by sending a search request to a search engine.

5. The method of claim 1 wherein querying at least one listing source comprises receiving a list of ordered results relating to the topics of interest provided.

6. The method of claim 1 further comprising, before storing a time at which the entry was retrieved and a rank received for each returned entry, classifying a sentiment of each returned entry and storing the sentiment with the stored time and rank.

7. The method of claim 1 wherein storing a time at which the entry was retrieved and a rank received for each returned entry comprises creating a row in a database table for each entry and including a URL for each entry as an identifier and an order of the entry in the returned results as the rank.

8. The method of claim 1 wherein comparing the returned entries comprises identifying a current entry and previous entry with a matching URL, and comparing the rank of the previous entry with the rank of the current entry to determine movement of popularity of content associated with the URL.

9. The method of claim 1 wherein generating at least one alert comprises accessing contact information for alerting a user from a monitoring profile and sending a communication to the user via the accessed contact information.

10. A computer-readable storage medium comprising instructions for controlling a computer system to monitor changes in relevance of online content, wherein the instructions, when executed, cause a processor to perform actions comprising:

receiving from a user one or more topics of interest to be automatically monitored;

querying at least one listing source for entries related to the received topics of interest;

storing a time at which the entry was retrieved and a rank received from the at least one listing source for each returned entry in a result store;

comparing the rank and time for the returned entries for the user with a previously stored rank and time related to an earlier instance of the returned entries for the same user to determine a rate of change in the rank of each entry over a particular period of time, and, a magnitude of change in rank of each entry;

identifying stored entries for the user that indicate at least one of a rate of change in rank at a rate greater than a first threshold stored by the system, or a magnitude of change in rank greater than a second threshold stored by the system; and generating at least one alert to one or more subscribers for each identified entry that has at least one of change in rank at a rate greater than the first threshold, or a magnitude of change in rank greater than the second threshold.

11. A computer-readable storage medium comprising instructions for controlling a computer system to monitor changes in relevance of online content, wherein the instructions, when executed, cause a processor to perform actions comprising:

receiving from a user one or more topics of interest to be automatically monitored;

querying at least one listing source for entries related to the received topics of interest;

storing a time at which the entry was retrieved and a rank received from the at least one listing source for each returned entry in a result store, the stored rank modified by a weighting factor based upon the at least one listing source, wherein the weighting factor indicates a historical level of influence and reliability of the at least one listing source;

comparing the rank and time for the returned entries for the user with a previously stored rank and time related to an earlier instance of the returned entries for the same user to determine a rate of change in the rank of each entry over a particular period of time, and, a magnitude of change in rank of each entry;

identifying stored entries for the user that indicate at least one of a rate of change in rank at a rate greater than a first threshold stored by the system, or a magnitude of change in rank greater than a second threshold stored by the system; and generating at least one alert to one or more subscribers for each identified entry that has at least one of change in rank at a rate greater than the first threshold, or a magnitude of change in rank greater than the second threshold.

* * * * *